United States Patent [19]
De Cock et al.

[11] Patent Number: 4,524,372

[45] Date of Patent: Jun. 18, 1985

[54] RECORDING APPARATUS

[75] Inventors: Etienne M. De Cock; Lucien A. De Schamphelaere, both of Edegem; Freddy M. Librecht, Boechout; Willy F. Van Peteghem, Berchem, all of Belgium

[73] Assignee: AGFA-Gevaert N.V., Mortsel, Belgium

[21] Appl. No.: 569,662

[22] Filed: Jan. 10, 1984

[30] Foreign Application Priority Data

Jan. 21, 1983 [EP] European Pat. Off. ........ 83200091.3

[51] Int. Cl.³ .................. G01D 15/14; G02F 1/01; H04N 1/22; H04N 3/14
[52] U.S. Cl. .................. 346/160; 346/107 R; 250/578; 350/331 R; 350/356; 358/213; 358/300; 358/302
[58] Field of Search ............ 346/107 R, 139 C, 155, 346/160; 358/212, 213, 285, 300, 302; 350/331 R, 356, 392; 250/578

[56] References Cited

U.S. PATENT DOCUMENTS 4,376,282 3/1983 Kotani et al. .................. 346/107 R Primary Examiner—Thomas H. Tarcza
Attorney, Agent, or Firm—William J. Daniel

[57] ABSTRACT

A recording apparatus for linewise recording information on a moving photoreceptor by means of a plurality of chips on each of which parallel sub-rows of uniformly spaced radiation sources are formed, wherein a shortcoming of prior art apparatus, namely the impossibility to use chips on which even one radiation source only is defect, is overcome.

The apparatus comprises two parallel rows of radiation sources, each row comprising reserve radiation sources that are arranged with corresponding basic radiation sources of the other group in optical parallelism, and connection circuit means for establishing electrical contact with a basic and/or a reserve radiation source (FIG. 5).

17 Claims, 14 Drawing Figures

RECORDING APPARATUS

This invention relates to apparatus for use in the linewise transmission of information and comprising a series of microelectronic transducers formed on chips and distributed along an elongate zone for transducing input signals representing increments of an information line.

Apparatus of that kind can be designed to fulfil a recording function by using transducers, e.g. light-emitting diodes, in the form of point-like radiation sources which emit radiation for forming an information record on a photoreceptor responsive to information-wise modulated electrical input signals. Apparatus of the said kind can alternatively be designed for linewise reading images by using transducers in the form of photo-sensors which yield electrical signals responsive to increments of a light pattern representing information to be read. Such electrical signals can be read out by means of registers comprising charge-coupled devices.

The production of the transducer assemblies of such apparatus at a reasonable cost poses a problem because of the very large number of transducers which are required for transmitting increments of a complete line of information and the fact that every transducer along the complete series must be effective.

To take an example, for producing a transducing head of a recording apparatus using light-emitting diodes it is generally considered that at least ten light points per mm are required in order to achieve an acceptable image resolution. In these circumstances, for recording a line information of a length corresponding with the width of a standard DIN A4 photoreceptor, namely 216 mm, the transducing head will have to incorporate at least 2200 diodes.

The light-emitting diodes are formed on monolithic chips which have to be mounted in precise alignment for forming the required complete series of diodes. It is obviously desirable for the individual chips to be as long as possible, because the procedure of mounting the chips tends to become more time consuming and costly the greater the number and the shorter the length of the chips. However the lengths of the chips which can be used has been restricted by the necessity to avoid the presence of defective diodes.

It is possible to obtain a defect-free array of light-emitting diodes on a monocrystalline substrate having a length of about 50 mm, this being at present about the maximum attainable length of such a substrate. But the production of defect-free arrays of that size repetitively under industrial conditions is not economically feasible. Arrays produced on 50 mm substrates normally have to be cut into shorter lengths in order to avoid the presence of defective diodes. In practice, the average length of the useful chips, i.e. chips without defective diodes, is usually between 1 and 10 mm. Generally, if only chips of about 10 mm or more in length are to be used, the production process is objectionably costly because so many chips have to be rejected.

The problem outlined above is associated not only with the production of chips bearing light-emitting diodes but also with the production of chips bearing arrays of other types of transducers for transmitting information-line signals.

The present invention provides apparatus having a transducer head which lends itself to more cost-effective production.

According to the present invention there is provided an apparatus for the line-wise transmission of information comprising a series of microelectronic transducers formed on chips and distributed along an elongate zone for transducing input signals representing increments of a line of information, which is characterised in that in addition to said series of transducers (hereafter called "primary transducers") there is at least one group of transducers (hereafter called "secondary transducers") which are individually aligned in a direction transverse to the length of said elongate zone with individual primary transducers; that at least one of said secondary transducers is a non-defective transducer which is transversely aligned with a defective primary transducer; that there is optical transfer means for transferring the image of any defective transducer and the image of the corresponding (i.e. transversely aligned) non-defective transducer onto a common transverse line, and that there is connection means for electrically connecting of a secondary transducer in the apparatus so that it is effective in lieu of or in addition to the corresponding defective primary transducer.

In an apparatus according to the invention as above defined the presence of one or more defective transducers on the assembled chips is allowed and compensated for. It is therefore possible to use chips which would hitherto have been rejected. If an array of transducers on a given chip is tested and found to contain one or more defective transducers that chip can nevertheless be used in the chip assembly forming the transducer head provided that the assembly includes a non-defective transducer in transverse alignment with the or each defective one.

In preferred embodiments of the invention, the chips of the transducer head assembly are arranged in staggered overlapping relationship in parallel files extending along the elongate zone and at least one group of secondary transducers is formed on a chip located in one of these files. If successive chips are disposed end to end, neighbouring transducers lying on opposite sides of the division between such chips may be at a greater spacing than neighbouring transducers on one chip. The arrangement of chips in staggered overlapping relationship in parallel flies is a feature known for avoiding such excess spacing. It is very convenient for the secondary transducers to be provided on a chip or chips located in one or both said files.

Preferably the transducers on each chip are arranged in two parallel staggered rows. By adopting such an arrangement it is possible to achieve a higher population density of transducers per unit length of chip, so that higher resolutions are possible.

In certain apparatus according to the invention, the secondary transducers are on a chip or chips other than those which carry the primary transducers. The secondary transducer chip or chips can be installed ab initio, i.e. at the initial transducer head assembly stage, after tests have been carried out to determine the location of defective transducers on the primary chips. Alternatively the secondary transducer chip or chips can be installed by way of repair of an apparatus in which one or more primary transducers has or have failed or become defective during use.

An important field of use of the invention is that of recording apparatus wherein addressable and energisable point-like sources of radiation are used as the transducers. In such recording apparatus, light signals from the transducers can be received by a photoreceptor which is conveyed continuously or step-wise past the transducer head in a directional normal to the said elongate zone occupied by the head. Optical transfer means is provided for transmitting images of the radiation sources onto a line running across the path of the photoreceptor. Various kinds of radiation sources can be used. The sources can be active chip areas that can be controlled either to directly produce radiation, or to intercept radiation that is produced by a source remote from the chips. The first of these categories comprises active radiators such as LED's, vacuum fluorescent based sources, plasma based sources, and the like. The second category comprises elements or light valves that are capable of modulating the light of a suitable radiation source. An example of such valves is a PLZT device. Examples of suitable radiation sources for such valves are incandescent bulbs, fluorescent tubes, etc.

The photoreceptor (when such is used) can be in the form of a sheet or web onto which the information is finally recorded, such as a sheet provided with a silver halide or a photoconductive layer. The photoreceptor may alternatively be a transfer medium, onto which an information image is produced that is then transferred to a receptor that is not photosensitive, such as plain paper. Known photoreceptors include ZnO, CdS and other suitable photoconductors.

Examples of optical transfer means are auto-focussing fibers, lens assemblies, and lenticular screens. Images of as many as four rows of radiation sources can if necessary be optically projected simultaneously onto one line of the photoreceptor. Such a transfer means may however not always be convenient or may be more complicated than is desired. If the light sources to be utilised for recording a single information line are disposed in more than two rows, it is preferred to use optical transfer means which simultaneously projects images of the light sources of two such rows onto a line of the photoreceptor and to incorporate a delay mechanism which causes images of the light sources of the other row or rows to be projected after a time interval which is related to the spacing thereof from the first said rows and to the speed of advance of the photoreceptor. Typical spacings between rows of light sources are between 50 and 200 microns and typical photoreceptor speeds are between 5 and 50 m.s$^{-1}$.

Further optional, advantageous optional features of the invention are as follows.

In apparatus wherein primary chips bearing primary transducers are arranged in staggered relationship in two parallel files, one or more secondary chips, bearing secondary transducers, can be located in one or each of such files, between primary chips. The secondary chips can be shorter than the primary ones. Usually, the secondary chips can be even less than half length of the primary chips.

The electrical connection paths to the transducers can comprise conductor strips each having one connection pad for connection to an output terminal of an integrated driver and two connection pads for connection to primary and secondary transducers. It is an advantage to provide transducer-bearing chips on conductor arrays forming a diagonally symmetrical assembly pattern so that by disposing a plurality of such arrays side by side but in alternately inverted relationship, the chips can be brought into parallel files as aforesaid despite the use of identical arrays.

The use of secondary chips for providing secondary replacement transducers has the advantage that in principle the total number of transducers incorporated in the apparatus can be equal to the sum of the primary transducers and the number of secondary transducers required as replacements for defective primary ones. In practice the total number of transducers will of course be somewhat greater, because the secondary chips will usually include secondary transducers additional to those which are actually needed.

A further advantage of using secondary chips, distinct from those bearing the primary transducers is that resistors for individual adjustment of the current of each transducer can be quite easily provided. This is beneficial when using radiation sources as transducers, in order to obtain equal radiation outputs for all sources.

If secondary chips as aforesaid are mounted in bridged position over a conductor array on a substrate, special provision for heat dissipation may be required under certain conditions.

Problems with heat dissipation can be avoided by using an alternative arrangement according to the invention wherein a plurality of chips bearing staggered rows of transducers are arranged in parallel files, the chips in different files having their end edges out of register so that there is no interruption in the required close relationship between signal transmission or reception points along a line, caused by inactive areas at the chip ends or by endwise spacing of neighbouring chips, and wherein one transducer row in each of said row of primary transducers and the other transducer row in such file provides secondary transducers. Electrical connection paths in the form of parallel conductor strips on a substrate, can be disposed between the files of chips, said conductor strips having connecting pads at both their ends to permit a secondary transducer in one file to be connected into circuit for operation in lieu of an aligned primary transducer in the other file. This arrangement has the advantage that the chips with the radiation sources can be mounted, for instance by adhesive bonding, on a solid heat conductive base, whereas a substrate bearing the conductor strips can be mounted on that base, between the two files of chips.

Certain embodiments of the invention will now be described by way of example, with reference to the accompanying drawings wherein:

FIG. 1 is a diagrammatic view of one embodiment of an apparatus according to the invention, FIG. 2 is a diagrammatic isometric view of a recording head and the optical transfer means of the apparatus according to FIG. 1, FIG. 3 is a lateral view of the recording head according to FIG. 2, FIG. 4 is a diagrammatic underplan view of one embodiment of the recording head, FIG. 5 is a diagrammatic plan view of a portion of one module of the recording head according to FIG. 4, FIG. 6 is an enlarged view of a portion of a LED array, FIG. 7 is a reproduction on a larger scale of part of a printed circuit on a module, such part being located between the lines 80–81 in FIG. 5;

Figure 1:
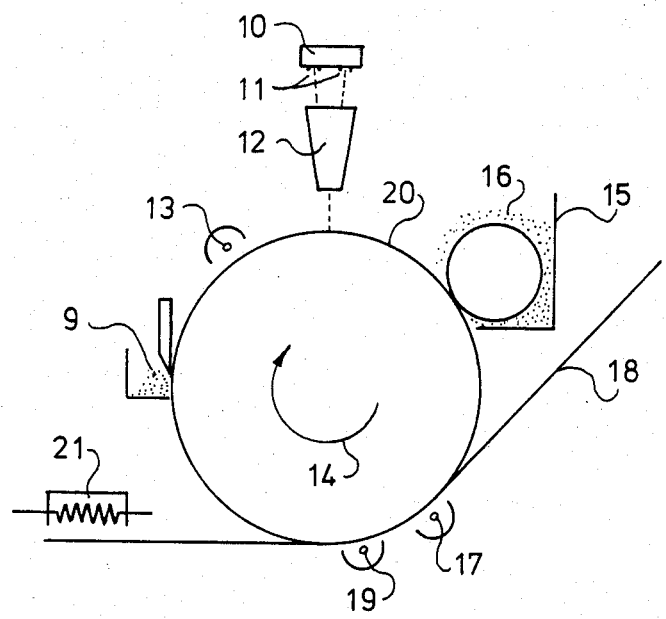

Referring to FIG. 1, a recording device is shown for linewise recording information upon a moving photoreceptor. The device comprises basic elements known in the art such as a recording head 10 that is provided with a great plurality of linearly arranged energizable pointlike radiation emitters 11, optical transfer means 12 for projecting the image of the emitters, and a photoreceptor in the form of a cylindrical surface of a drum 20. known materials for the photoreceptor are doped selenium, polyvinyl carbazole, CdS, CdSe, SeTe, etc.

The operation of the device may be as follows. A corona discharge startion 13 electrically charges the surface of the drum 20, the sense of rotation of the drum being indicated by the arrow 14. The areas of the drum surface that become exposed by the emitters become discharged whereas the other, unexposed areas maintain their charge. The electrostatic charge pattern thus produced is developed by a developing station 15 wherein a developer composition 16 is brought into contact with the charge pattern on the drum.

A corona transfer station 17 transfers the toner pattern from the drum surface onto a paper sheet 18 that is moved in contact with the drum. A corona separator station 19 is effective to separate the paper sheet from the drum. A fuser station 21 may fuse the toner pattern on the sheet so that a permanent copy is obtained. A cleaner station 9 may be operative to remove all the toner still remaining on the drum surface therefrom before a next exposure is made.

It will be understood that the present illustration of the photoreceptor in the form of a drum is merely for illustrative purposes, and it is clear that the photoreceptor may as well take other forms such as a belt for transferring the charge image to a suitable support. Further, it is clear that the final support itself may be photosensitive thereby directly to operate as a photoreceptor that is exposed. Examples of suchlike photoreceptors are supports coated with a light-sensitive layer such as ZnO, silver halide, etc.

Figure 2:
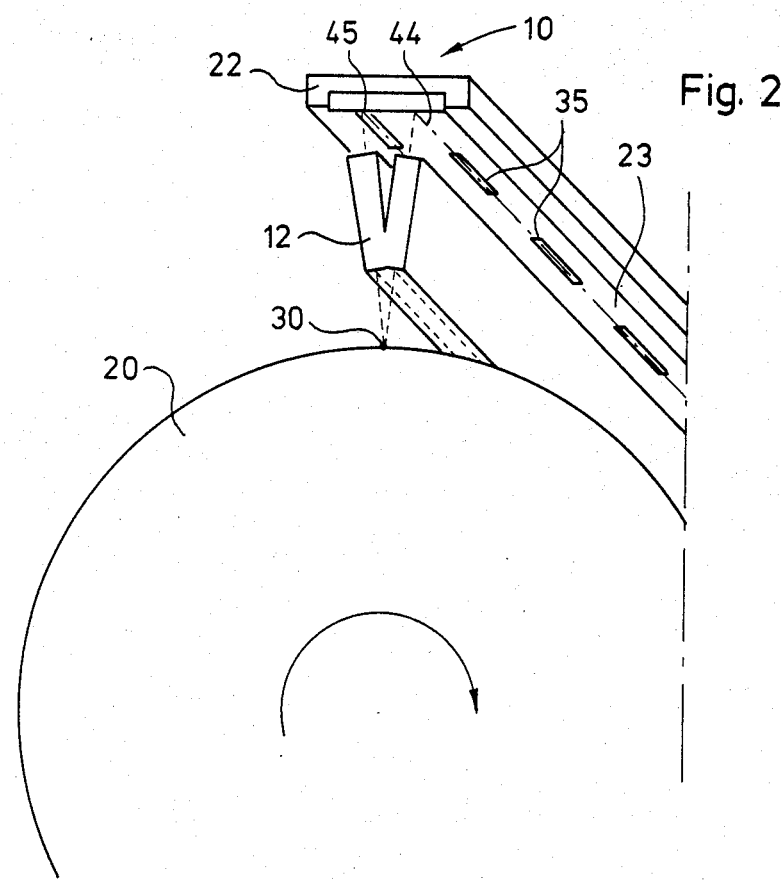
Figure 3:
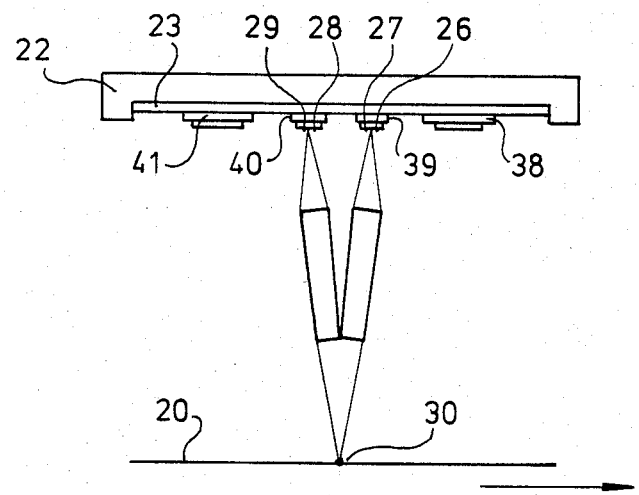

An isometric view of part of the exposure head 10 and the optical transfer means 12 is shown in FIG. 2. The exposure head (see also FIGS. 3 and 4) comprises an elongate channel section bar 22 wherein several exposure modules 23, in the present example three of them, are mounted in end to end alignment. Each exposure module comprises several chips 35 (in the present example nine of them) comprising primary radiation emitters mounted on an insulating substrate, e.g. a ceramic wafer. These chips are distributed in staggered relationship in two parallel files 44 and 45. The emitters on each chip are likewise disposed in staggered relationship in two parallel rows, so that in fact there are four rows 26, 27, 28 and 29 of emitters on each module, see FIG. 3, such rows running parallel with the axis of the drum 20.

The optical transfer means 12 is an elongated V-shaped element that is capable of focussing the emitters of two corresponding rows, e.g. of rows 27 and 29, onto one line 30 on the photoreceptor. The two other corresponding rows, namely 26 and 28 will also be focussed on one transfer line. In the operation of the apparatus, the energizing of the emitters of the sub-rows 26 and 28 occurs with a certain delay with respect to the energizing of the emitters of the sub-rows 27 and 29, so that the images of the emitters of sub-rows 26 and 28 line-wise coincide on the photoreceptor with the images of the sub-rows 27 and 29.

A suitable construction of the transfer means 12 comprises a V-like assembly of two self-focussing fibre elements.

Figure 4:
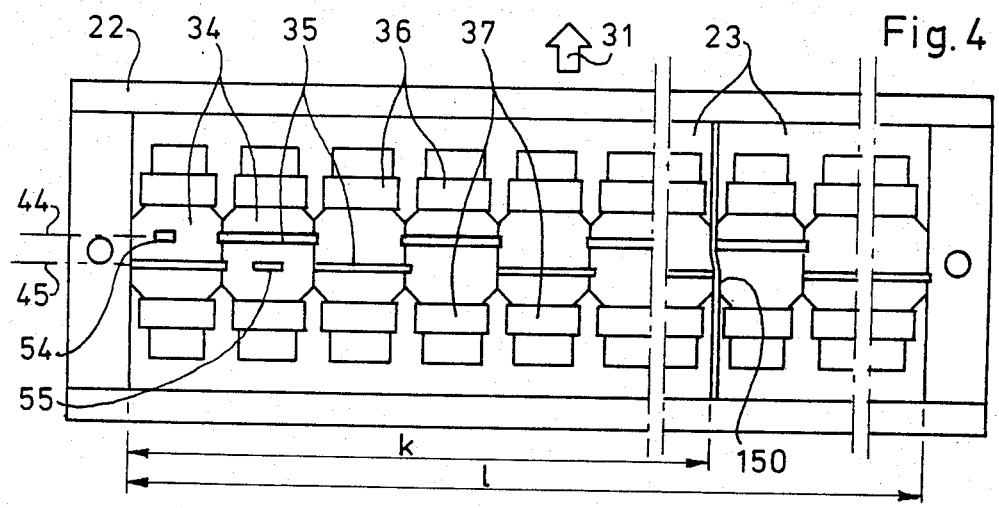

Referring to FIG. 4, each of the three modules 23 has a length k $26d$ the combined length of these modules is l. This length corresponds with the desired length of an image line on the photoreceptor. The outer modules have a straight outer end edge. The inner end edges of those modules and the two end edges of the middle module have a slightly stepped form, as shown for the edges 150 in FIG. 4. This stepping is such that the pitch between the outer emitters of the chips nearest to the junction between two adjacent modules (for example the pitch of the emitters $L_{128}$ and $L_{129}$ in FIG. 5) corresponds with the pitch between all other neighbouring emitters.

The direction of movement of the photoreceptor past the exposure head is indicated by the arrow 31. The bar 22 is preferably made of a material that besides good heat conducting properties has a good dimensional stability and is also electrically conductive. Suitable materials for the bar are e.g. aluminium, brass and copper. The modules 23 each comprise an electrically insulating base plate, e.g. a ceramic substrate, that is suitably secured in the bar by means of a quickly curing electrically insulating epoxy adhesive.

Each module is provided on its base plate with printed conductors forming a number of identical conductor arrays 34, corresponding with the number of staggered chips 35 on said module. In the present example, there are thus nine adjacent conductor arrays 34 per module 23.

Figure 5:
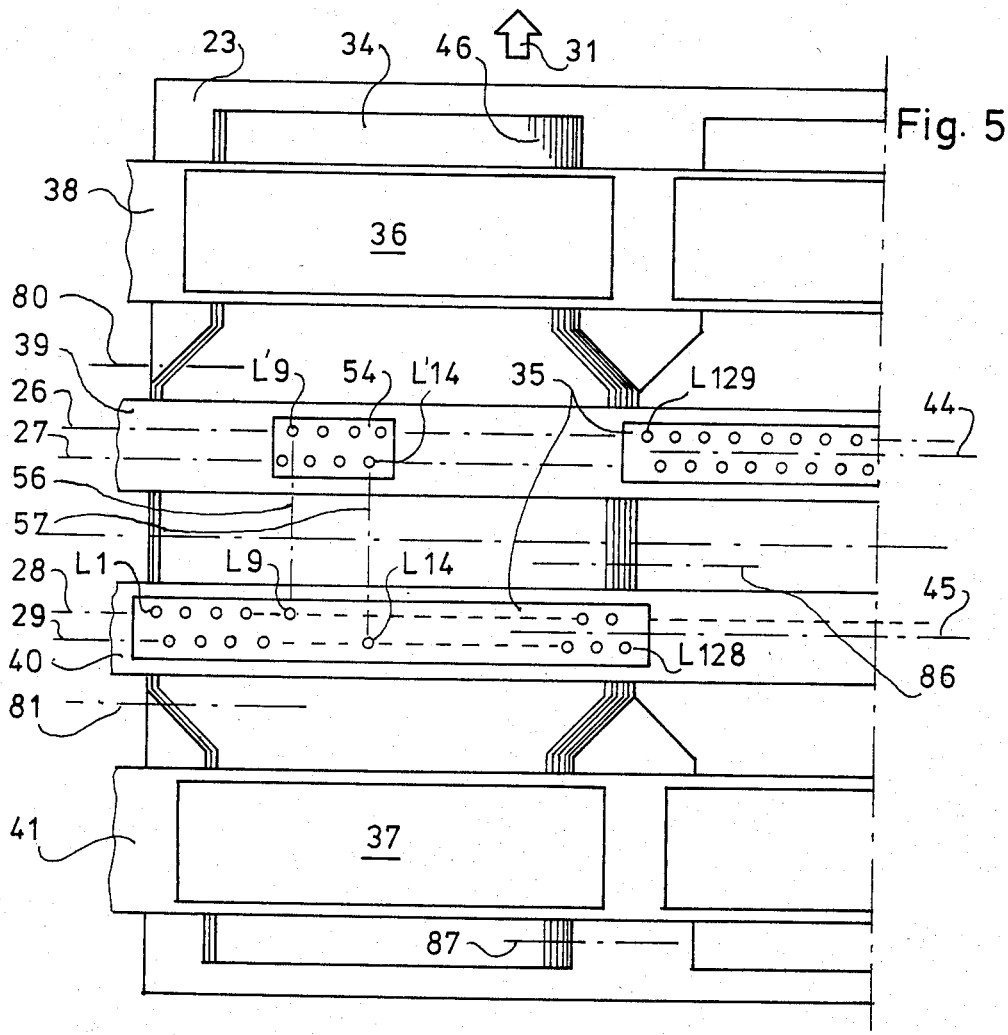

The mounting of the chips and integrated drivers 36 and 37 for the emitters can be effected as follows. The insulating base plates of the modules being mounted in the bar 22 as above described, four elongate flat bars 38–41 of a good heat conductive material, e.g. copper or aluminium, are fixed in parallel relationship onto the printed conductor arrays of the modules by means of an electrically insulating adhesive. These bars are not shown in FIG. 4 because of the small scale of said figure, but they are shown in FIG. 5 which shows on an enlarged scale two adjacent conductor arrays of a module of FIG. 4. The bars are shown also in FIG. 3. The chips 35 are placed in staggered relationship on the two inner bars 39 and 40 in files 44 and 45. The bonding of the chips to the bars preferably occurs by means of an electrically conductive adhesive so that in that way the ground connection for the emitters is established through the bars. The two drivers 36 and 37 for each chip are bonded to the outer bars 38 and 41 by means of an electrically insulating adhesive. The electrical connections between the emitters, the conductor arrays and the drivers are made by wire bonding as will be further described hereafter. The conductor arrays 34 have relatively wide central portions whose combined widths substantially corresponds with the width of the photoreceptor, and two narrower end or tail portions. Each such array comprises a plurality of conductor strips which are parallel in the central and tail portions of the circuit and diverge on the intervening portions thereof. In the present example each conductor array 34 comprises one hundred and twentyeight conductors. For the sake of clarity only a few of the conductors have been illustrated in FIG. 5. The conductors may be formed on the insulating base plates of the modules by means of known thin film techniques comprising the vacuum coating of the insulating substrate with a metallic layer, the coating of the metallic layer with a photographic layer, the pattern-wise exposure, the hardening development, the rinsing, the etching of the conductor layer on the insulating base plate through the pattern of the remaining photographic layer, and finally the cleaning of the member.

Since in the further description, light emitting diodes will be considered for the emitters, the term LED's will hereinafter be used for these elements.

The chips 35 carrying the primary LED's are monocrystalline chips. Each of such chips should in principle carry as many as possible of such LED's. In practice this means approximately 350 LED's, this being the number of LED's which can be formed on a chip of 22 mm length, at a density of 16 LED's per mm. A chip length of 22 mm constitutes is commonly regarded as the maximum chip length consistently attainable if the chips are to be free of or to bear only a few defective LED's.

Figure 6:
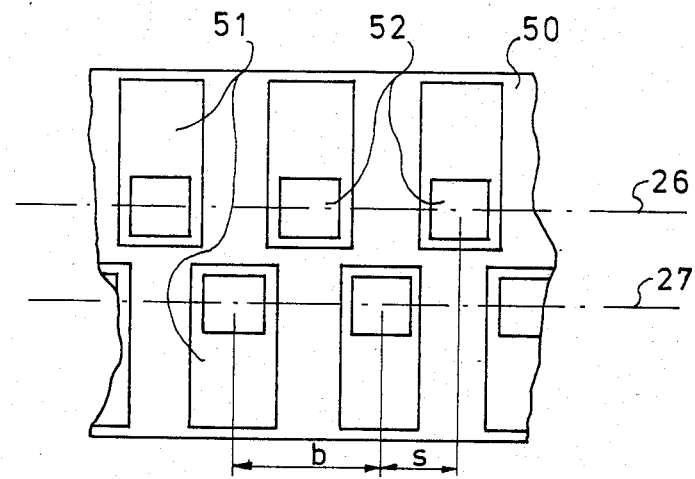
Figure 7:
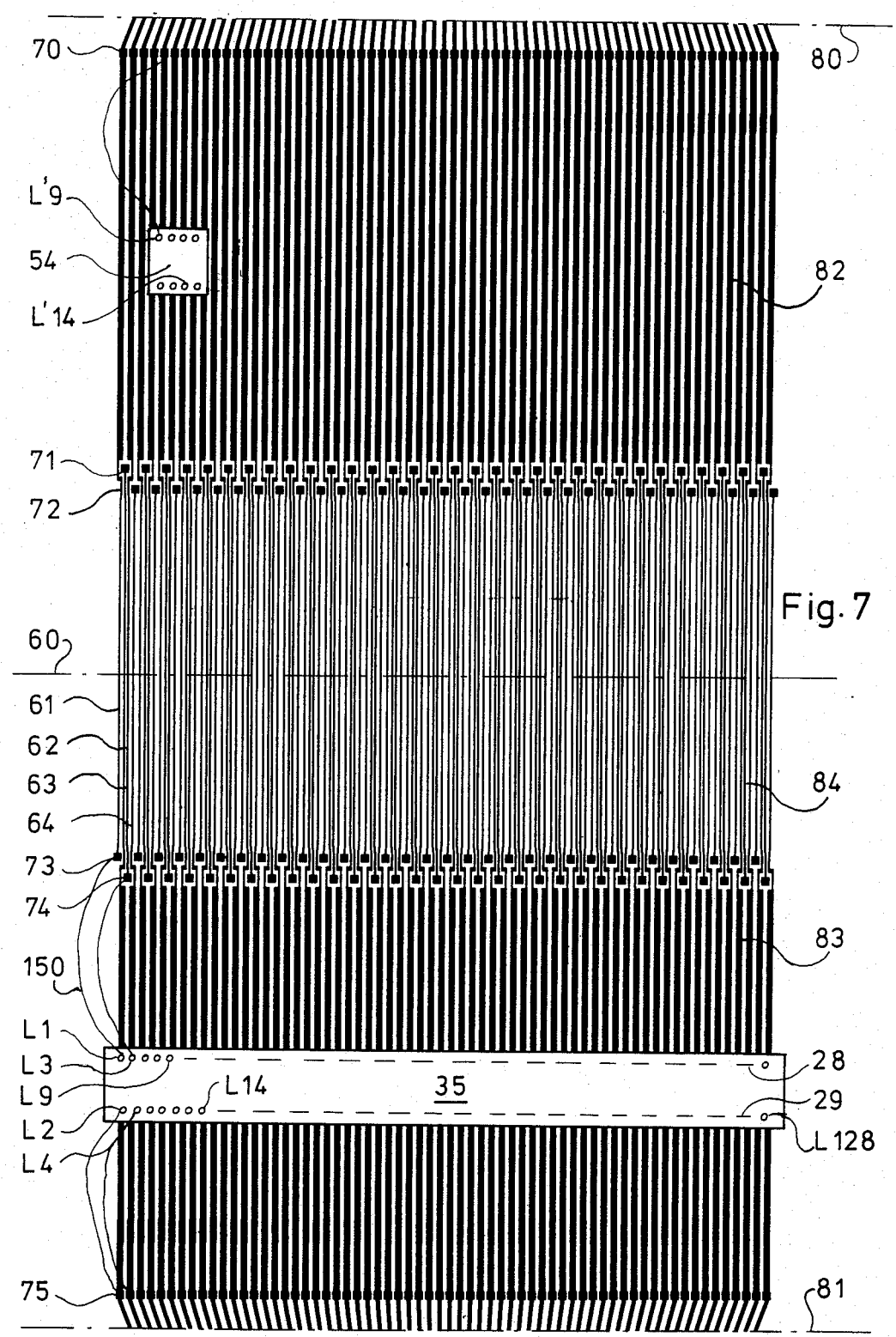

In FIGS. 4 and 5 there have been illustrated chips 35 each comprising each exactly 128 LED's, in order to facilitate the numbering, and the description of the apparatus, but it should be understood that the chips 35 may comprise different numbers of LED's, e.g. the first array 35 may comprise 350 LED's, and thus cover nearly three conductor arrays 34, the second chip 35 may comprise 210 LED's, etc., until the length k of the module has been covered. Each chip comprises two staggered rows of equally spaced LED's. The spacing of the LED's in the rows is such that if images of their LED's are projected normally to the rows onto a common plane, such images will touch or nearly touch each other. This feature is apparent in FIG. 6 which shows part of a chip on a larger scale. In this figure the LED's have been illustrated in their actual form, instead of the symbolic form of a circle as in FIG. 5. Referring to FIG. 6, the 2×64 LED's (two rows each of 64 LED's) are formed on a chip substrate 50 having the form of a rectangle. The chip may have a length of approximately 8 mm and a width of 1 mm. The chip has been cut from a bar that itself has been cut from a slice with a diameter of about 5 cm onto which a great plurality of LED arrays have been formed by means of monolithic integration techniques. The chip 50 actually comprises a GaAs substrate that is provided on its lower side with a $Au^+ + Sn$ layer, and at its upper side with an epitaxially grown GaAsP (n-type) layer. In said upper layer there have been formed discrete Zn diffusion (p-type) areas. They are distributed in two rows 26, 27, each row comprising 64 of such areas which are uniformly spaced and are staggered with respect to the areas of the other row. The light emission is provoked by an electrical field that is produced between the lower $Au^+ + Sn$ layer and suitable electrodes which are located on top of the GaAsP layer and surround the mentioned Zn diffusion areas. The electrodes are normally formed by aluminium strips vacuum deposited in the form of two rows of strips 51 that at their inner ends have openings 52. These openings coincide with the sites of the mentioned Zn diffusion areas. Application of a suitable voltage to any of the electrodes 51 causes a "LED" to be operative at the corresponding area 52. The connection between each LED and the connection pad of the corresponding conductor strip of the conductor array 34 is formed by a fine wire of gold that is applied according to the ball-and-stitch technique, or by a fine wire of aluminium applied according to the wedge-wedge technique, known in the art. The mentioned connections, as well as the connections of the driver circuits to the printed circuit, are illustrated in FIG. 7 which shows a portion of the connection circuit which will be described further in the description.

In this first embodiment of apparatus according to the invention, chips 54 and 55 (see FIGS. 4 and 5) bearing further LED's (secondary LED's) are disposed in the files 44,45. The chips bearing secondary LED's are identical to the chips 35, except for the fact that they have a much smaller length and the number of LED's which they carry is correspondingly smaller. In fact they have been cut from the same slice or slices from which the chips 35 have been cut. The shorter chips are cut from what remains of such slices after the maximum number of longer chips 35 each having no or only a few defective LED's have been taken from said slice(s). Each of the shorter chips such as 54,55, disposed in one of the files 44,45 is located opposite part of a longer chip 35 in the other of such files and so that the secondary LED's in the rows 26 and 27 (see FIG. 5) are in optical alignment with primary LED's in the rows 28,29 respectively. What is meant here by optical alignment is an alignment as represented by the broken lines 56,57 in FIG. 5, parallel with the direction of movement of the photoreceptor indicated by the arrows 31. These lines demonstrate the optical alignment of secondary LED's $L_9^1$ and $L_{14}^1$ on chip 54 with primary LED's $L_9$ and $L_{14}$ respectively of the opposed longer chip 35. The secondary LED's on shorter chip 55 (FIG. 4) will likewise be in optical alignment with the primary LED's on the opposed longer chip in file 44. This principle is followed for any further secondary LED chips which may be provided.

Each of the shorter chips such as 54,55 can bear a considerable number of defective LED's while still serving its useful purpose according to the invention, because the sole requirement is that the chip must have at least as many non-defective LED's as there are defective LED's on the opposed longer chip 35, and that the positions of such non-defective LED's on the shorter chip mus be such that the shorter chip can be mounted with a non-defective LED in optical alignment with each defective LED on said longer chip. The secondary LED chips can be fixed in position in the same way as the primary LED chips. The said secondary LED chips can be mounted in position at the manufacturing stage of the exposure head, after the primary chips have been examined and suitable secondary LED chips have been selected. Secondary LED chips can also or alternatively be installed by way of repair if in use it is found that one or more primary LED's do not operate satisfactorily.

It may occur that two or even more small secondary chips need to be provided for providing replacement LED's to replace the defective LED's of one primary chip. This in particular may be necessary in the case of a long primary chip, for instance a chip bearing approximately 350 LED's as mentioned hereinbefore.

The electrical connection of a defect-free secondary LED in parallel with a defective primary LED is effected by electrically connecting the defect free LED with the appropriate conductor strip of the conductor array 34. This is described hereinafter with reference to FIG. 7 which is an enlarged illustration of a portion of the circuit situated between the broken lines 80 and 81 in FIG. 5. The actual width of the circuit is 8 mm, and it provides conductors for one hundred and twenty LED's.

The conductor array comprises sixty four parallel conductor strips 82 that extend between transverse rows of connection pads 70 and 71, 72, and, symmetrically with respect to the transverse axis 60, a further sixty four parallel strips 83 that are situated between the rows of connection pads 73, 74 and 75. The central zone of the circuit comprises one hundred and twenty eight strips 84 that form the interconnections between the strips 82 and 83 is shown.

The connection of the chips 35 to the conductor array is as follows. The first LED $L_1$ is connected by a fine wire 150 of gold which is joined at one end to the extremity of the LED electrode 51 (see FIG. 6) and at its other end to the first connection pad of the row 73. The second LED $L_2$ is connected similarly to the first connection pod of the row 75.

The third LED $L_3$ is connected to the first connection pad of the row 74, and the fourth LED $L_4$ is connected to the second connection pad of the row 75. It may be seen that in the mentioned way the first four LED's are connected to the first four conductor strips 61–64 of the central zone strips 84. This order of connection is repeated for the other LED's $L_5$ through $L_{128}$ of the chip 35.

The electrical connections of replacement LED's of a secondary chip 54 to cover defective LED's of the opposed primary chip 35, are as follows.

A supposed defective LED $L_9$ of the chip 35 is replaced by the LED $L'_9$ of the secondary chip 54 by connecting $L'_9$ to the fifth of the connecting pads of row 70. Similarly, a defective LED $L_{14}$ is replaced by $L'_{14}$, by connecting $L'_{14}$ to the fourth connecting pad of the row 71. The mentioned connections occur likewise by wire bonding. It will be appreciated that the wire loops constituting the connections are in practice in planes normal to the plane of the drawing and not in a horizontal plane as illustrated, that being merely for the purpose of the illustration.

In the foregoing example each replacement LED is electrically connected in parallel with the defective one. It will be understood that this is possible only in those cases wherein the defective LED is not short-circuited, and is not responsible for excessive current consumption. Thus, the defective LED must as it were form part of an almost "open" electric circuit. If these conditions are not satisfied it is necessary to break the connection of the defective LED by rupturing its wire connection to the corresponding connecting pad of the printed circuit.

The description hereinbefore related to one conductor array 34 only. It will be understood that the substitution of defective LED's in other conductor arrays, of a module occurs in the same way. Despite the staggered arrangement of the primary chips on a module, as a result of which the successive chips are at different positions along the length of their conductor arrays, as clearly appears in FIGS. 4 and 5, the condcutor arrays and their respective primary chips are identical assemblies. This is possible because the conductor arrays are "diagonally symmetrical". In other words each array, such as the one illustrated in FIG. 7 affords the same connection pattern when rotated in its own plane through 180 angular degrees. For instance, the conductor strip running from the connecting pad at the left hand end of row 70 down to the corresponding pad of row 73, has its equivalent in the strip running from the connecting pad at the right hand end of row 75 up to the corresponding connecting pad of row 72.

Figure 8:
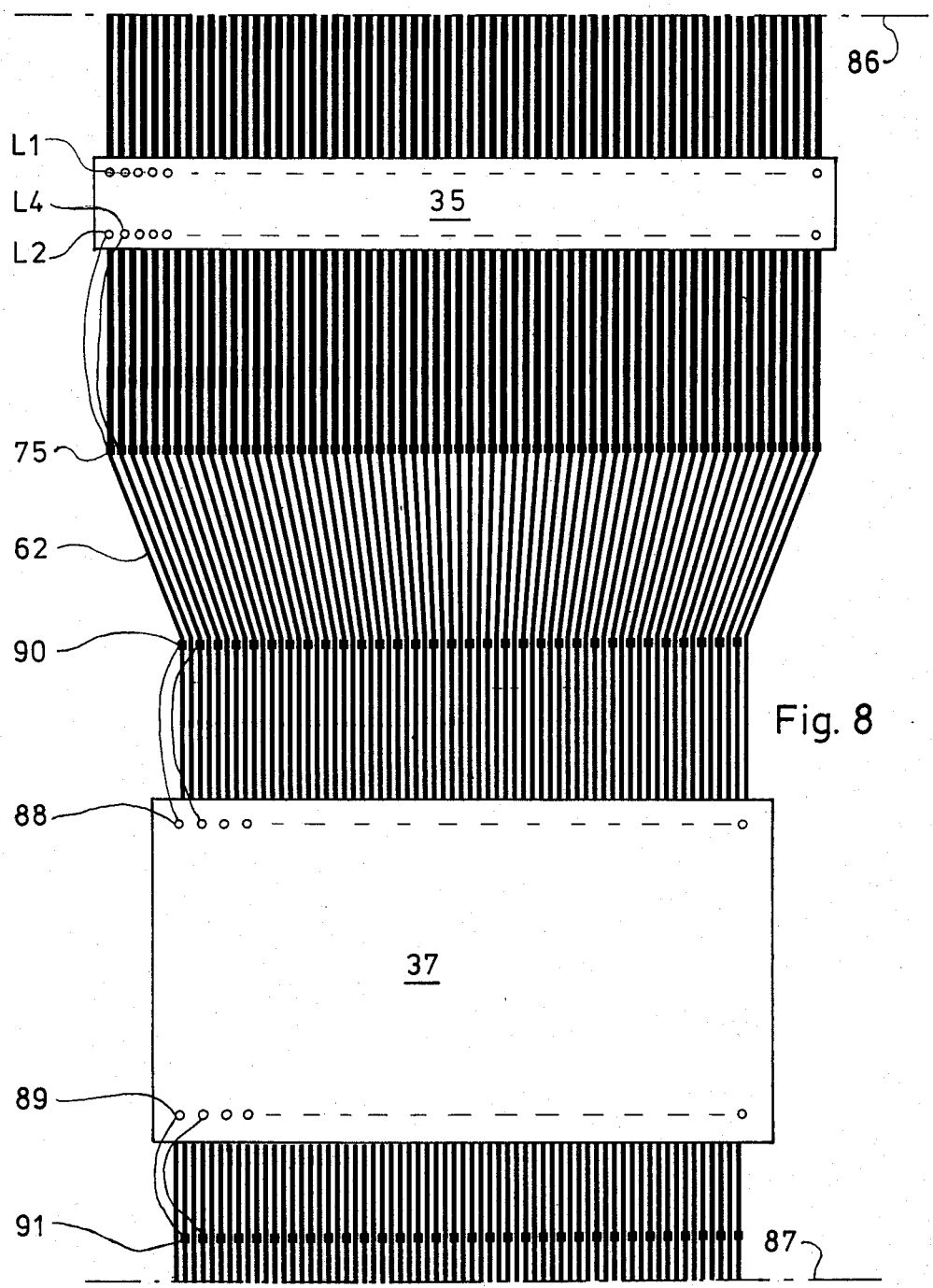
FIG. 8 is a reproduction on a similar scale of the part of said printed circuit between lines 86–87 of FIG. 5.

The electrical connection of the LED arrays to the drivers is illustrated in FIG. 8, which shows a portion of one of the printed conductor arrays 34 of FIG. 5 comprised between lines 86 and 87.

The integrated driver 37 is manufactured according to monolithic integration techniques on a single chip, and comprises 64 similar circuits which will be explained in detail in the further description, and the outputs of which are provided on the chip in two rows 88, 89 of 32 connecting pads each.

The connection of the driver is as follows. The first output connecting pad of row 88 is connected by wire bonding to the first connecting pad of the row 90 of the conductor array 34. The second output pad of row 88 is connected to the second connecting pad of row 90 (this is the third conductor strip of the conductor array), etc. The first output pad of row 89 of the driver 37 is connected to the first pad of row 91, i.e. to the second conductor strip of the conductor array 34. The second output pad of row 89 is connected to the second pad of row 91, etc. In the mentioned way, the 2×32 output connecting pad of the driver are connected in staggered order to sixty four even number LED's (from $L_2$ to $L_{128}$) of the primary chips 35. The odd numbered LED's from 1 through to 127 of the chip 35 are connected in a similar way, via the connecting pads of rows 73 and 74, the conductors 84 and 82, and the bonding areas of the row 70, with the driver 36 that is provided at the other side of the primary chip. The two drivers thus together provide one hundred and twenty eight outputs, one for each LED of the chips 35. The integrated drivers are somewhat shorter than the corresponding primary chips so that the laterally aligned integrated drivers of the neighbouring conductor arrays can be spaced from each other as appears in FIG. 4.

By appropriate switching of the image or information signals for the LED's between the two drivers, and by suitable retardation of the output signals of one driver with respect to the output signals of the other driver, one and the same transverse line on the photoreceptor can be exposed to the radiation from all of the LED's notwithstanding the splitting of the LED's into two separate rows. Whether a primary or a secondary radiation source is operative to expose the photoreceptor is immaterial, because the primary and secondary LED's are in optical alignment as already mentioned.

Figure 9:
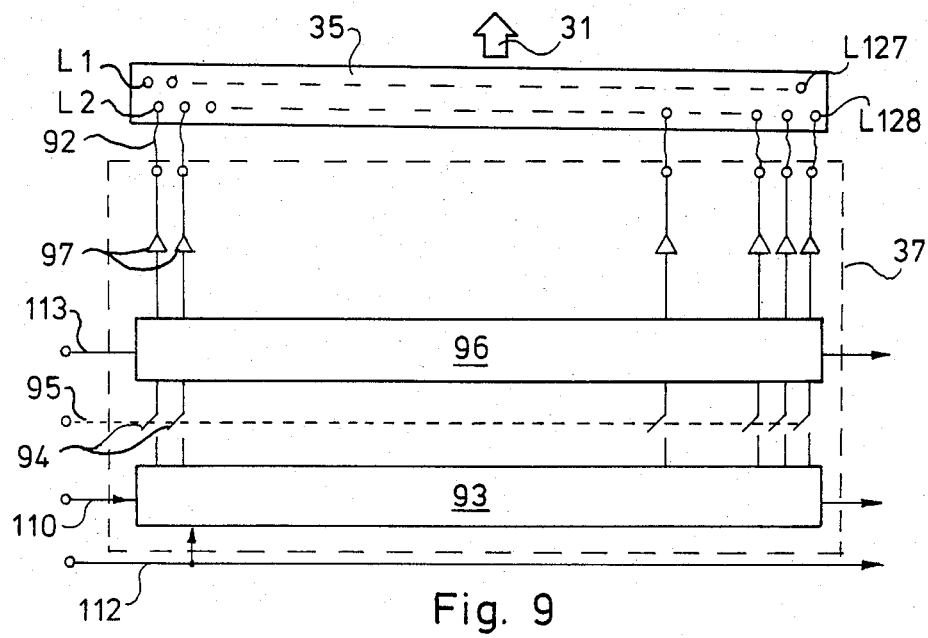
FIG. 9 illustrates diagrammatically the electronic circuitry associated with one integrated driver circuit of the exposure head according to FIG. 4.

One of the integrated driver circuits associated with one conductor array 34 and shown by the blocks 36 and 37 in FIG. 5, is illustrated in detail in FIG. 9. The other driver circuit is the same. In circuit 37, 93 is a 64-steps shift register, 94 are load switches that are simultaneously controllable by a line 95, 96 is a latch register, and 97 are individual drivers for the respective LED's. The outputs of the drivers 97 are connected by means of fine wires 92 to the corresponding even numbered LED's, $L_2$ to $L_{128}$ of the chip 35. Another and similar driver 36 (not shown in FIG. 9) is similarly connected to the odd-numbered LED's $L_1$ to $L_{127}$. All the described elements of the block 37 (and likewise the ones of the identical block 36 for driving the odd-numbered LED's $L_1$ to $L_{127}$), are preferably integrated on a monolithic chip. The output pads or terminals 99 of the drivers 97 of the driver circuit have been shown located in a single line for the purpose of the drawing, but in actual fact said driver output terminals are arranged in staggered relationship in two rows, one on each side of the integrated driver circuit as illustrated by the rows of points 88 and 89 in FIG. 8.

Figure 10:
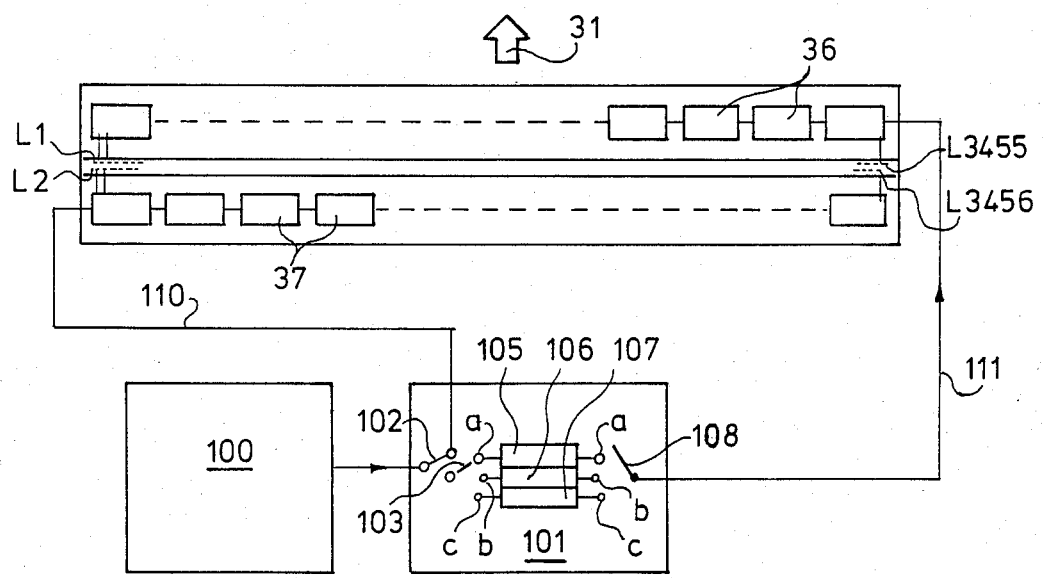
FIG. 10 is an electronic block circuit diagram relating to the apparatus according to FIG. 1.

The circuits for the control of the information flow to the rows of LED's of the exposure head are illustrated diagrammatically in FIG. 10, wherein 100 is a recording signal generator, 101 is a controller with an input selector switch 102 that alternately applies the input signal to the rows of even and odd numbered LED's, 103 is an input memory selector with three positions a, b and c, 105, 106 and 107 are memories, 108 is an output memory selector likewise with three operative positions a, b and c. It will be understood that in practice the device will comprise many other circuits for the control of the different operations, such as a generator for a clock frequency, setting and re-setting circuits, synchronization circuits, etc. All these circuits are known in the art, and a description of them is not required for the understanding of the operation of the apparatus.

The generator 100 produces an electric recording signal for the first image line to be recorded on the photoreceptor. The switch 102 is controlled by the clock frequency, e.g. a frequency of the order of magnitude of 3 MHz, such that the signal for the first image point of the first image line is put in the memory 105 through switch position 103a, the signal for the second image point is put on line 110, the signal for the third image point in memory 105, the next one on line 110, and so on. The even image signals that are fed to the driver circuits 37 via line 110 are shifted successively through the shift registers of said circuits, under the control of the clock signal on line 112, until finally 1728 distinct image points have been read-in. These are the even line points. At the same time, 1728 odd line points have been read-in in the memory 105. The total number of 3456 image points corresponds with the capacity of the recoring head that comprises 3 modules each having nine arrays of 2×64 LED's.

An appropriate signal on line 95, see FIG. 9, causes the switches 94 briefly to close, so that the signals for the even numbered image points of every chip 35 are now transferred from the register 93 to the latch register 96. The signals are stored in the latch register 96 and by the drivers 97 the corresponding current is applied to the several even numbered LED's (i.e. $L_2$ through $L_{64}$ the first chip, and $L_2$ through $L_{3456}$ for the complete recording head).

When the photoreceptor has been advanced over a distance corresponding with the thickness of a recording line, the latch registers 96 are reset by an appropriate signal on line 113, and signals for the second image line to be recorded are produced by the generator 100.

The second line signals are now read-in. The even image point signals are again fed to the shift register 93 of driver circuits 37, but the odd image point signals are now fed to the memory 106 through selector position 103b. The switches 94 are closed through a control signal on line 95, and the even image points of the second image line are now recorded.

The third image line recording signal is then produced by the generator 100, and the even image points thereof are recorded as described already for the first and second lines. The odd image points are stored in the memory 107 through selector position 103c. At the moment the switch 103 is put in the position 103c, switch 108 is put in the position 108a, so that the odd image point signals for the first image line, which have been stored in memory 105 are read out into the shift registers of the driver circuits 36 through line 111, in synchronism with the reading-in of the even signals of the third line into the shift registers of the circuits 37. The delay of the recording of the odd image points over two lines with respect to the recording of the even image points compensates for the distance between two adjacent LED rows, e.g. 26–27.

When the fourth image line recording signal is produced by the generator 100, and the even image point signals are directly recorded by being fed to the drivers 37 via line 110, the odd image points are recorded through 103a in the memory 105 from which the odd image point signals for the first image line have in the meantime been removed into the shift registers of the drivers 36. The said direct recording of the fourth image line even signals is accompanied by a simultaneous recording of the second line odd signals read from the memory 106 through switch position 108b.

The recording of the fifth and further image lines occurs according to the sequences described hereinbefore.

The following data relate to the illustrated apparatus above described.

Recording head:
  total recording length: 216 mm
  number of primary LED's per chip: 2×64
  number of primary chips: 27
  number of secondary LED's per chip: variable
  number of secondary chips: variable
  number of LED's per mm recording length: 16
  number of modules: 3
  number of primary chips per module: 9
  row spacing d: 125 microns
  LED spacing b: 125 microns
  staggering s: 62.5 microns
  active LED area 52: 2250 square microns
clock frequency: 3 Mhz
optical transfer means: two Selfocs, type SLA 20, manufactured by Nippon sheet glass Co., Ltd.
recording speed: 10 cm.s.$^{-1}$ It will be understood that the mentioned values of 2×64 primary LED's per chip and 9 primary chips per module, are only for the illustrated example. In practice both said values can be varied, since it will be endeavoured to use chips with as many LEDs as possible, e.g. containing up to 350 LED's as mentioned already hereinbefore. Thus, usually less than nine primary chips will be required in order to cover one module.

The apparatus described hereinbefore permits the substitution of a defective LED by an effective LED. The apparatus does not, however, enable a compensation to be made for LED's with different characteristics, in order to keep the light outputs of the LED's uniform within a given tolerance range.

The apparatus described can be modified to include electrical compensation means for the individual LEDs.

Figure 11:
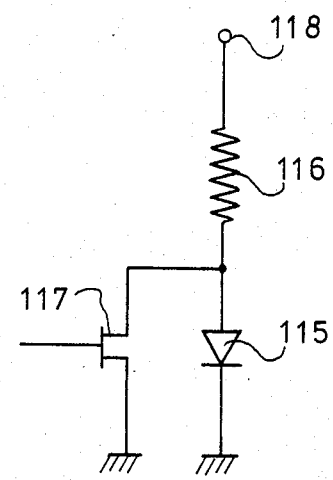
FIG. 11 illustrates an electronic LED compensation circuit.

Such a compensation means is illustrated diagrammatically in FIG. 11 wherein one driver 117 of the series of individual drivers 97 of FIG. 9 is represented. The supply voltage on point 118 is continuously applied to each LED 115 through a series resistance 116. The de-energizing of the LED 115 is obtained by the closing of the output of the semi-conductor driver 117 whereby the lower terminal of the resistance 116 is grounded and the voltage over the LED becomes zero. In a practical embodiment the resistance is formed by a series circuit of several integrated resistors with corresponding connecting pads, so that by suitable short-circuiting of individual resistors, an individual correction of the current through each LED in the operative condition may be carried out.

Figure 12:
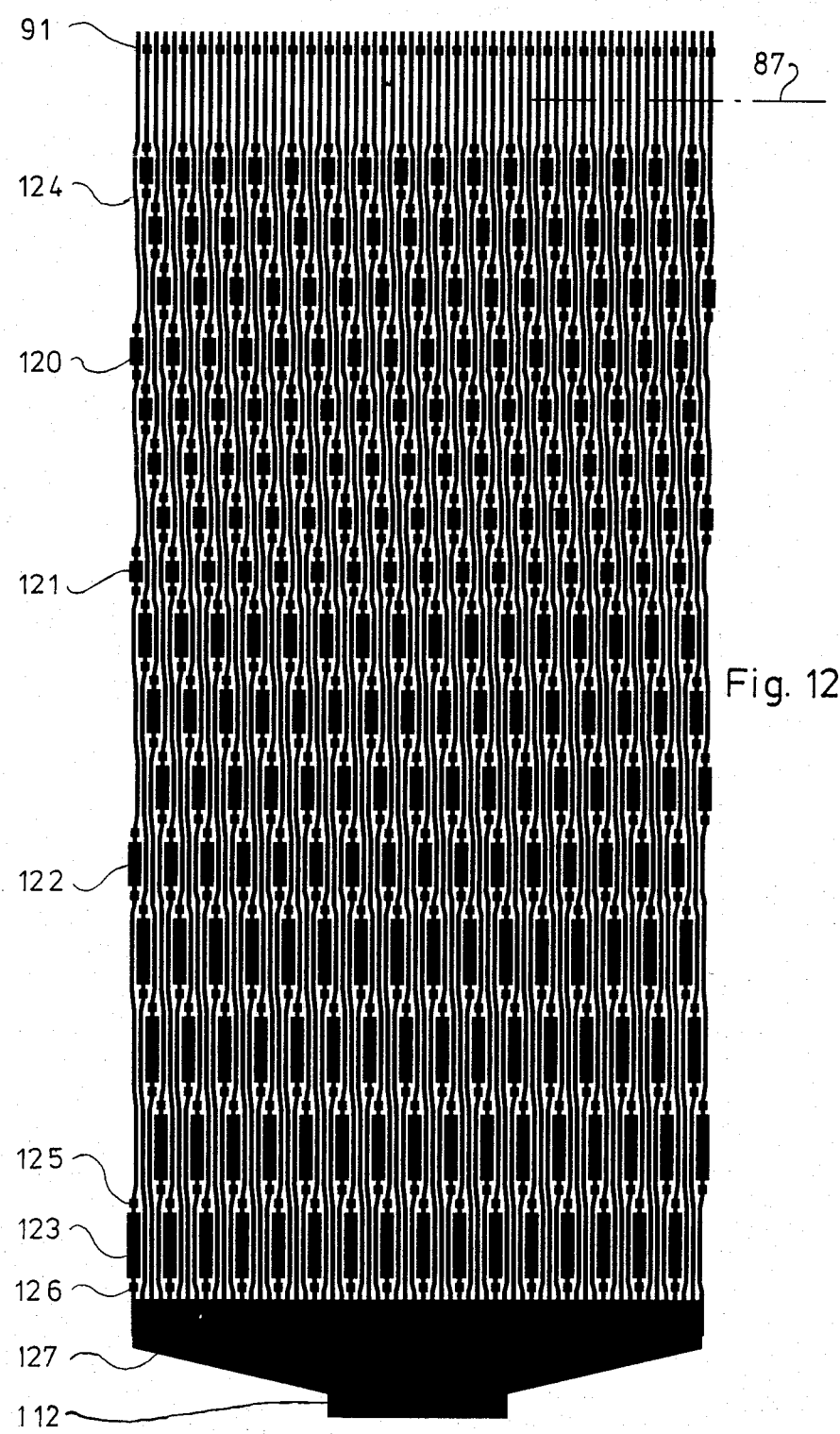
FIG. 12 shows a resistor arrangement that may be incorporated in that part of the printed circuit of FIG. 8, which lies below line 87.

FIG. 12 illustrates an extension of the printed circuit of FIGS. 7 and 8 that permits individual LED compensation as described with reference to FIG. 11. The printed circuit section of FIG. 12 should be considered as a downward extension from line 81 of FIG. 8. This circuit accordingly compensates for differences in the output of the even numbered LED's. A second circuitry (not illustrated) identical to that of FIG. 12 but rotated relative thereto through 180 degrees, forms an upward extension of the printed circuits 34 above the drivers 36 and serves to compensate for differences in the outputs of the odd LED's.

Each of the 64 conductors of the circuit of FIG. 12 is provided with four series resistors such as the resistors 120, 121, 122 and 123 illustrated for the first conductor strip 124, which is in fact an extension of the conductor strip 62 in FIGS. 7 and 8, and which is connected to the first even numbered LED $L_2$. The four resistors differ in their values. Each resistor is situated between two terminals or connecting pads such as 125 and 126 illustrated for the resistor 123. The resistors can be formed by conventional integrated circuitry techniques. Any one or more of the resistors can be short-circuited by interconnecting the two terminals of the or each such resistor by wire bonding. It will be apparent that the four different resistor values enable sixteen different combinations of resistance values to be obtained. In the mentioned way LED's with differing characteristics may be individually compensated to produce an acceptably uniform light output. The sixty four resistor circuits are connected in parallel through the conductor branch 127 which at 118 is connected to the supply voltage for the LED's.

The following data pertain to the described circuit.
Resistor 120: 50 ohms
121: 40 ohms
122: 80 ohms
123: 120 ohms The foregoing is only an example of a compensation circuit. As alternative resistors can be provided which are arranged in series-parallel combination to perform a controlling function on the LED circuits. As another example, one resistor can be provided for each LED and the resistors can be arranged in such a way that its initial resistance cen be increased to a desired value by partial destruction of its resistive surface, for instance by sublimation by means of a laser.

The apparatus described hereinbefore has the advantage that the number of LED's which it incorporates is equal to the number of desired image points plus the number of defective LED's. In practice the total number of LED's will be slightly larger than that minimum because the chips incorporating the secondary substitute LED's, will generally comprise more LED's than are actually required to cover the defective primary LED's.

Heat dissipation from the LED's, the compensation resistors and the integrated drivers of the apparatus above described with reference to FIGS. 1 to 12 may in some circumstances be insufficient in spite of the copper strips 38 through 41. This is because these electronic components are mounted on top of the insulating, e.g. ceramic, support. In a second embodiment of the invention which will now be described there is better heat transfer from the various components. A further advantage of this second embodiment is the reduced number of bondings as compared with the number of the first embodiment.

Figure 13:
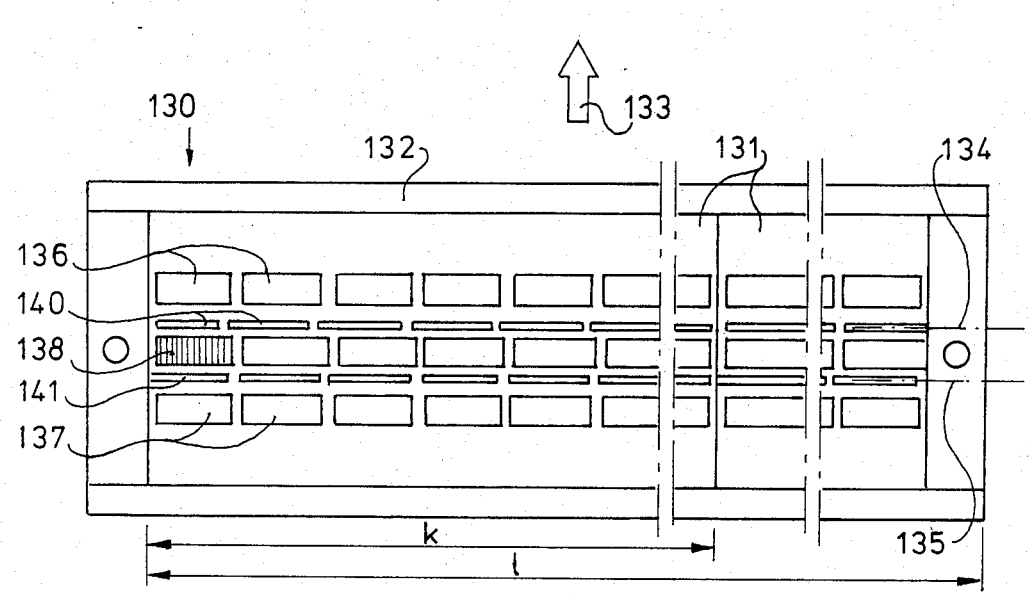
FIG. 13 is a diagrammatic plan view of a second embodiment of the recording head.

Referring to FIG. 13 which is a view of an exposure head 130 looking from the optical transfer means towards the head, a number of modules 131 each having a length k, are mounted next to each other in a channel-section bar 132 so that the total exposure length l corresponds with the desired width of the image on the photoreceptor. The direction of movement of the photoreceptor past the exposure head is indicated by the arrow 133. The bar is made of copper, brass, aluminum or other electrically conductive material. The modules 131 are suitably secured in the bar by means of a quickly curing electrically and thermally conductive epoxy adhesive.

Each module is provided with a plurality of chips 140 and 141, each chip bearing an array of LED's. The chips are arranged in parallel files 134 and 135. The chips of the two files are slightly laterally shifted with respect to each other so that the inactive areas at the ends of and between neighbouring chips of one file are overlapped by chips of the other file. Each module is further provided with integrated driver circuits 136 and 137, and a conductor circuit 138 between the two files of chips. These components are also suitably fitted to the module 131 by means of an electrically conductive adhesive.

Figure 14:
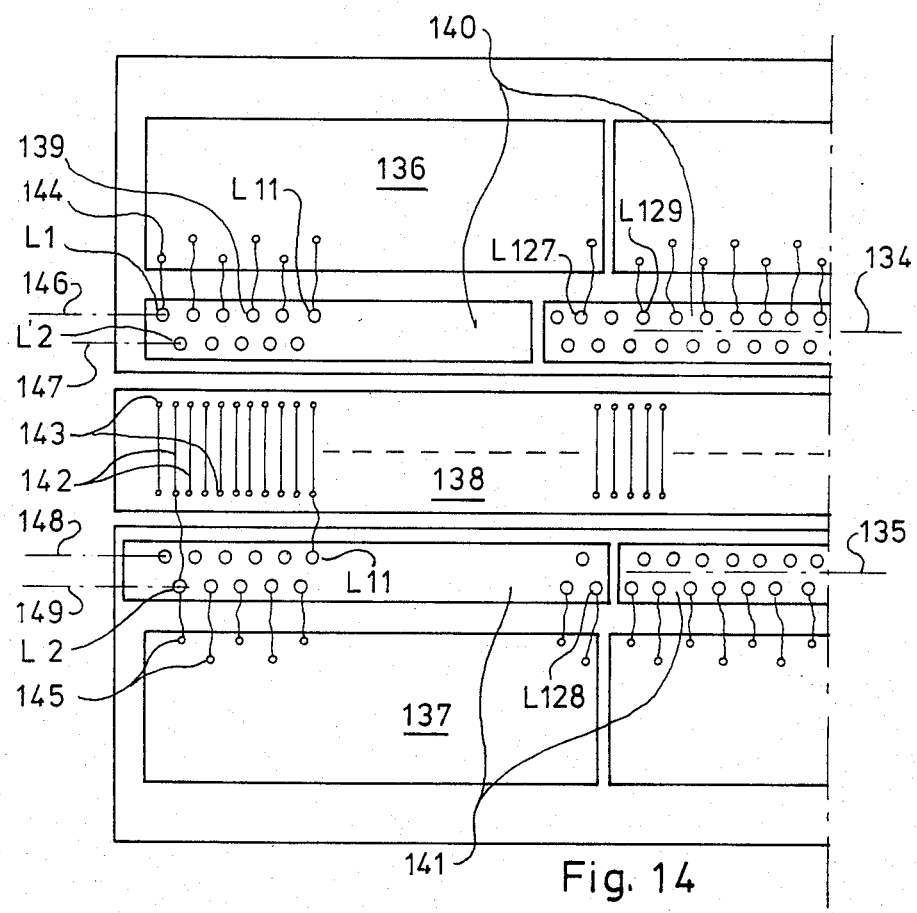
FIG. 14 shows on a larger scale, adjacent LED arrays of the recording head according to FIG. 13.

FIG. 14 shows on a larger scale two adjacent LED chips of each of the files 134 and 135. The individual LED's 139 are represented by small circles, but they will actually have a more suitable form, e.g. as illustrated in FIG. 6. The LED's of each chip are arranged in staggered rows, 146, 147 respectively 148, 149 and the LED's of rows 146 and 148, and of rows 147 and 149 are in optical alignment with each other in the same way as the LED's hereinbefore described with reference to FIG. 5. Each chip may comprise 2×64 LED's.

The conductor circuit 138 comprises a dimensionally stable, e.g. ceramic, support on the exposed surface of which a plurality of parallel conductor strips 142 are formed that terminate in connecting pads such as 143.

Each of the integrated drivers 136 and 137 comprises sixty four outputs, the terminals 144 or 145 of which are situated on the side of the driver which is nearer the corresponding LED array. Those outputs are arranged in staggered rows so as to provide more space for effecting the wire bondings to the LED's.

The basic connection pattern of the LED's is one wherein the LED's of the row 146 of the chips 140 on the file 134 are connected to the corresponding integrated drivers 136, and wherein the LED's of the sub-row 149 of the chips 141 on the row 135 file connected to the integrated drivers 137. The mentioned connections are carried out by wire bonding as described hereinbefore, and are represented for some LED's only in the Figure.

The LEDs of rows of 146,149 of LEDs are the so-called primary LED's of the exposure head. The LEDs of rows 147 and 148 are the secondary LEDs.

The electronic operation of the integrated drivers 136 and 137 is similar to the operation of the drivers described with reference to the first embodiment of the invention. Thus, the exposure of for instance a transverse line on the photoreceptor, occurs by energizing the LED's of rows 149 and 147, and the delayed energizing, in dependence on the speed of the photoreceptor and the separation between the two LED sub-rows of each chip, of the LED's of sub-rows 148 and 146.

The linewise coincidence of the images of the LED's of sub-rows 146 and 148 with each other on the photoreceptor, and similary of sub-row 147 with sub-row 149, so ensured by means of an optical transfer means as described hereinbefore with reference to the first embodiment of the apparatus.

The described basic connection pattern of the LED's is in practice not sufficient because one or more LED's will be present that do not operate satisfactorily. It is of course possible to assemble the exposure head from chips with defect-free LED arrays only but only at the cost of rejecting a considerable number of defective chips as explained already in the introduction of the specification.

Two examples of LED substitution are illustrated by way of example for the primary LED's $L_2$ and $L_{11}$. The primary LED $L_2$ of sub-row 149 being considered as defective, two extra wire bondings are made in order to connect the optically aligned secondary LED $L'_2$ of row 147 to the first output terminal of driver 137 via the conductor 142 of the conductor circuit 138. The LED's $L_2$ and $L'_2$ which are in optical alignment are thereby electrically connected in parallel. In consequence of this connection and the fact that the light transfer means projects the images of the corresponding LED sub-rows 147 and 149 onto a single line of the photoreceptor, the exposure of the corrresponding point on the photoreceptor occurs as if the LED $L'_2$ were in the same place as LED $L_2$. As the second example FIG. 14 shows a defective LED $L_{11}$ similarly connected via a conductor strips 142 with a secondary LED $L'_{11}$.

Because the purpose of the secondary LED's is to provide for substitution of the defective primary LED's, only a limited number of secondary LED's will be effectively used. Therefore the conductor circuit 138 may comprise fewer conductors 142 than are illustrated in FIG. 14. For instance, it may suffice for the number of conductors 142 to be only between one fifth and one third of the number of LED's in one chip files 134 or 135.

The second embodiment of the apparatus does not permit correction or compensation of the characteristics of the individual LED's. For that purpose a much more complicated connection circuit would be required. However, correction of differences in the radiation outputs of individual LED's can be carried out by contact exposing a transparent plate with a light-sensitive high-resolution photographic layer of the negative type to the energized exposure head to obtain by processing of the light-sensitive plate a correction filter with a pre-determined maximum density, for instance a density of 0.5 in order to limit attenuation of the radiation. It is clear that the weakest radiation source will cause the weakest exposure and consequently the smallest optical density of the correction filter. After processing the filter is remounted in exact registering with the exposure head, so that the net result will be that in use the irradiation of the photoreceptor is substantially the same for all the LED's.

The invention is not limited to the described embodiments.

The filter compensation technique mentioned for use with the second embodiment of the apparatus may also be used with the first embodiment of the apparatus.

The apparatus according to the invention can also be designed to operate as a line imager, as mentioned already in the introduction of the specification, and the microelectronic transducers take in such case the form of radiation sensitive elements. An example of a line imager is a CCD (charge coupled device) line imager wherein an array of radiation sensitive elements is employed which generate charge packets dependent on the quanta of photons incident on the sensors. Such charge packets are sequentially transferred along a read-out register to an output stage responsive to clocking impulses.

We claim:

1. Apparatus for the line-wise transmission of information comprising a series of microelectronic transducers formed on chips and distributed along an elongate zone for transducing input signals representing increments of a line of information, characterised in that in addition to said series of transducers (hereafter called "primary transducers") there is at least one group of transducers (hereafter called "secondary transducers") which are individually aligned in a direction transverse to the length of said elongate zone with individual primary transducers; that at least one of said secondary transducers is a non-defective transducer which is transversely aligned with a defective primary transducer; that there is optical transfer means for transferring the image of any defective transducer and the image of the corresponding (i.e. transversely aligned) non-defective transducer onto a common transverse line, and that there is connection means for electrically connecting a secondary transducer in the apparatus so that it is effective in lieu of or in addition to the corresponding defective primary transducer.

2. Apparatus according to claim 1, wherein said primary transducers are formed on chips arranged in staggered overlapping relationship in parallel files extending along said elongate zone and wherein at least one group of secondary transducers is formed on a chip located in one of said files.

3. Apparatus according to claim 1, wherein the transducers on each chip are arranged in two parallel staggered rows.

4. Apparatus according to claim 1, wherein the secondary transducers in the apparatus are on at least one chip which is additional to the chips bearing the primary transducers.

5. Apparatus according to claim 2, wherein each file of chips provides one row of primary and one row of secondary transducers and there is a staggered relationship between the two rows of primary transducers and between the two rows of secondary transducers.

6. Apparatus according to claim 1, wherein said transducers are addressable and energisable point-like sources of radiation for irradiating a photoreceptor and the apparatus includes means for conveying a photoreceptor along a path running in said direction transverse to said zone, and optical transfer means for transmitting images of said radiation sources onto a line running across said photoreceptor path.

7. Apparatus according to claim 6, wherein there is a plurality of groups of radiation sources constituting primary transducers arranged for irradiating successive points along said line each of which groups has two drivers located so that said group is between them, and said drivers are connected to said group by an array of conductors whereby a first source of said group is connected to one of said drivers, the next source of such group is connected to the other of said drivers, and so on alternately.

8. Apparatus according to claim 7, wherein there is a plurality of identical modules each comprising a plurality of said conductor arrays each having a said primary transducer group and pair of drivers, each of such arrays forms a diagonally symmetrical conductor pattern on which the associated primary transducer group is located asymmetrically between the said pair of drivers, and the said arrays are assembled side by side with adjacent arrays in end for end inverted relationship to each other so that the primary transducer-bearing chips of the assembly are in two parallel staggered files.

9. Apparatus according to claim 7, wherein on each conductor connecting a said radiation source to one of the drivers there are first and second connecting pads at which a primary radiation source and a secondary radiation source respectively can be connected to said conductor.

10. Apparatus according to claim 7, wherein in each conductor in each of said conductor arrays there is a resistor whereby the current through the associated radiation source can be adjusted.

11. Apparatus according to claim 10, wherein each of said resistors is an integrated resistor which is provided between two connecting points to which a wire can be connected for short-circuiting such resistor.

12. Apparatus according to claim 10, wherein each of said resistors has a planar configuration and affords a resitance capable of controlled reduction by controlled destruction of its surface.

13. Apparatus according to claim 6, wherein an optical mask is provided for the radiation sources to compensate by optical density differential for differences in the radiation intensity of different radiation sources.

14. Apparatus according to claim 6, wherein said radiation sources are light-emitting diodes.

15. A method of constructing a transducing head comprising a series of microelectronic transducers distributed along an elongate zone for transducing input signals representing increments of a line of information, which method comprises assembling a selection of chips each bearing a plurality of said transducers, to form a complete said series of transducers, and connecting the transducers to conductors for transmitting signals, characterised in that the chips which are selected and connected to said conductors together provide on the one hand a multiplicity of transducers (hereafter called "primary transducers") which in quantity and relative locations are appropriate for forming a said series of transducers but at least one of which primary transducers is defective, and on the other hand a plurality of additional transducers which in a direction transverse to the length of said elongate zone are individually aligned with individual primary transducers, said additional transducers including at least one non-defective transducer in such transverse alignment with a said defective primary transducer, and in that said at least one non-defective secondary transducer is electrically connected to a said conductor for operation in lieu of said aligned defective primary transducer.

16. A method according to claim 15, wherein the chips which are selected and connected to said conductors are assembled in two parallel staggered files extending along said elongate zone.

17. A method according to claim 15, wherein the said primary transducers are provided by some of the assembled chips and the said secondary transducers are provided by at least one other chip.

* * * * *